United States Patent
Towndrow

(12) 
(10) Patent No.: US 6,858,142 B2
(45) Date of Patent: Feb. 22, 2005

(54) POLLUTED WATER TREATMENT SYSTEM

(75) Inventor: Anthony Philip Towndrow, New South Wales (AU)

(73) Assignee: Rootzone Australia Pty Ltd., New South Wales (AU)

(*) Notice: Subject to any disclaimer, the term of this patent is extended or adjusted under 35 U.S.C. 154(b) by 0 days.

(21) Appl. No.: 10/387,974

(22) Filed: Mar. 13, 2003

(65) Prior Publication Data

US 2003/0217954 A1 Nov. 27, 2003

Related U.S. Application Data

(63) Continuation of application No. PCT/AU01/01151, filed on Sep. 13, 2001.

(51) Int. Cl.$^7$ ............................. C02F 3/32; C02F 3/30
(52) U.S. Cl. ..................... 210/602; 210/605; 210/617; 210/622; 210/747; 210/150; 210/170; 210/906
(58) Field of Search ............................ 210/602, 605, 210/617, 621, 622, 747, 170, 196, 252, 259, 903, 906, 150, 151

(56) References Cited

U.S. PATENT DOCUMENTS

| | | | | |
|---|---|---|---|---|
| 4,124,405 A | * | 11/1978 | Quienot ..................... | 106/697 |
| 4,274,966 A | * | 6/1981 | Palmer ...................... | 210/618 |
| 4,306,910 A | * | 12/1981 | Miyoshi et al. ............. | 106/715 |
| 4,547,290 A | * | 10/1985 | Pichat ........................ | 588/257 |
| 5,078,882 A | * | 1/1992 | Northrop .................... | 210/602 |
| 5,156,741 A | * | 10/1992 | Morrison et al. ........... | 210/602 |
| 5,525,230 A | * | 6/1996 | Wrigley et al. ............. | 210/618 |
| 5,690,827 A | * | 11/1997 | Simmering et al. ........ | 210/602 |
| 5,733,453 A | * | 3/1998 | DeBusk ...................... | 210/602 |
| 5,744,041 A | * | 4/1998 | Grove ........................ | 210/602 |
| 5,755,852 A | * | 5/1998 | Northrop ....................... | 71/9 |
| 5,897,777 A | * | 4/1999 | Zoeller et al. .............. | 210/602 |
| 5,993,649 A | * | 11/1999 | DeBusk et al. ............. | 210/97 |
| 6,001,382 A | | 12/1999 | Levy | |
| 6,200,469 B1 | * | 3/2001 | Wallace ..................... | 210/150 |
| 6,264,838 B1 | * | 7/2001 | Nivens, Jr. ................. | 210/602 |
| 6,379,543 B1 | * | 4/2002 | Bowman .................... | 210/170 |
| 6,531,062 B1 | * | 3/2003 | Whitehill .................... | 210/602 |
| 2003/0111409 A1 | * | 6/2003 | Austin et al. ............... | 210/602 |

FOREIGN PATENT DOCUMENTS

| | | | |
|---|---|---|---|
| DE | 4305754 | * | 9/1994 |
| GB | 2 026 462 A | | 2/1980 |
| JP | 57-53295 | * | 3/1982 |
| JP | 57-75189 | * | 5/1982 |
| JP | 2-241596 | * | 9/1990 |
| JP | 5-277495 | * | 10/1993 |
| WO | WO 98/58881 A1 | | 12/1998 |

* cited by examiner

Primary Examiner—Fred G. Prince
(74) Attorney, Agent, or Firm—Stinson Morrison Hecker LLP

(57) ABSTRACT

A polluted water treatment system 10 operated to reduce impurities in sewerage polluted water to an acceptable level for dumping. The system includes a horizontal subsurface filter (HSF) 12 having an inlet zone 18 through which the inflow of polluted water is permitted to pass, a treatment zone 20 which permits the polluted water to undergo treatment by removal of at least some of the impurities of the polluted water and an outlet zone 22 from which the treated polluted water flows from the HSF 12. The impurities may include, for example, organic materials (BOD and COD) and oxidization processes within the HSF may reduce the quantity of the nitrites that are dumped from the outflow zone 22. The outlet zone 22 also includes a collection well 28 having a pump 30 located therein to recycle the treated effluent back to either the inlet zone 18 of the HSF 12 or to a secondary vertical filter 40. A level switch 26 located in the inlet zone 18 of the HSF 12 controls the level of water in the inlet zone to a set level 15 by regulating the amount of recycle water returned to the HSF 12 or indirectly via the vertical filter 40. The vertical filter 40 may be used to pre-treat any polluted water before it enters the HSF 12 and furthermore, it may also be used to remove phosphates from the polluted water.

9 Claims, 6 Drawing Sheets

POLLUTED WATER TREATMENT SYSTEM

CROSS-REFERENCE TO RELATED APPLICATIONS

This application is a continuation of International Application No. PCT/AU01/01151 filed Sep. 13, 2001 and claims priority therefrom. International Application No. PCT/AU01/01151 was published under PCT Article 21(2) in English under Publication No. WO 02/22510 A1. International Application No. PCT/AU01/01151 claims priority from Australian patent application PR 0124 filed Sep. 13, 2000.

FIELD OF THE INVENTION

The present invention relates to a polluted water treatment system and to a method of control and installation of same.

BACKGROUND OF THE INVENTION

Filters are often used to remove impurities from polluted water systems. One known set of filters is based on the fact that polluted water can be passed through a media which is planted with emergent macrophytes and under the action of bacterial and chemical reactions and adsorption by the media pollutants are broken down or adsorbed by the filter. Such filters are commonly known by the generic name of constructed wetlands. Flow may be either vertical or horizontal. In the art, if the flow within a filter is horizontal, it is known colloquially as a "Horizontal Subsurface Filter" (HSF) and if vertical, it is known colloquially as a "Vertical Filter" (VF).

Both HSFs and VFs are very efficient at breaking down organic pollutants (BOD and COD) and retaining suspended solids from waste water but they are much less efficient at removing nitrogen and in the case of phosphorus or heavy metals the effect is very low without very substantial increases being made in the size of the filter. Another potential disadvantage of these filters is that the loading of the filter may (and frequently does) occur in a non-uniform manner due to the requirements of the facility which the filter is servicing. Therefore, a designer of such a filter has to design for the processing of peak loads. This can result in inefficient use of the filter and results in a larger filter being required to service particular facilities. This can subsequently increase the costs of constructing the filter.

The applicant does not concede that the prior art discussed in this specification forms part of the common general knowledge in the art at the priority date of this application.

SUMMARY OF THE INVENTION

According to a first broad aspect of the invention, there is provided a constructed wetland polluted water treatment system for substantially reducing impurities in polluted water, the system comprising:
- a primary filter bed having an inlet zone through which inflow of polluted water travels therethrough, a treatment zone through which said polluted water undergoes treatment by removing at least a portion of said impurities and an outlet zone from which treated polluted water is removed from said filter bed;
- level control means for controlling the level of inflow waste water in said inlet zone;
- a secondary filter for receiving water from the primary filter, the secondary filter receiving substantially all of the water from the outlet zone of the primary filter; and
- recycle means for returning at least a portion of said treated polluted water from said secondary filter to said inlet zone or said treatment zone of said primary filter.

The primary filter may be a horizontal subsurface filter (HSF). The primary filter may optionally include a filter medium selected from soil, sand, gravel, vermiculite or various man made substances, including granulated blast furnace slag and steel furnace slag fines and mixtures of two or more thereof.

Optionally, the secondary filter is a vertical filter (VF). The media within the secondary filter may be coarse and the conditions within the secondary filter are generally aerobic to thereby nitrify at least a portion of said polluted water.

A plurality of emergent macrophyte plants may be planted in the media of the treatment zone According to a second broad aspect of the invention, there is provided a constructed wetland polluted water treatment method for substantially reducing impurities of polluted water, the method comprising the steps of:
- (a) permitting polluted water to flow into an inlet zone of a primary filter bed
- (b) removing at least a portion of said impurities in a treatment zone;
- (c) removing treated polluted water from an outlet zone adjacent to an end of said treatment zone;
- (d) treating water from the outlet zone of the primary filter bed in a secondary filter and recycling a portion of the water leaving the secondary filter to the primary filter bed and disposing of the remainder of the water from the secondary filter bed; and
- (e) controlling the level of inflow polluted water in said inlet zone by regulating the quantity of treated polluted water recycled in step (d).

According to a third broad aspect of the invention, there is provided an apparatus for treating polluted water characterised in that the water contacts a particulate material, which particulate material includes granulated blast furnace slag and/or steel furnace slag fines.

The steel furnace slag fines and/or blast furnace slag fines may be mixed with other granular material, said other granular material optionally including any one or more of the following: sand, soil or gravel vermiculite.

The apparatus may comprise a constructed wetland polluted water treatment system. The constructed wetland polluted water treatment system may be of the sub-surface flow type.

According to a fourth broad aspect of the invention, there is provided a method for treating polluted water characterised in that the water contacts particulate material, which particulate material includes granulated blast furnace slag and/or steel furnace slag fines.

BRIEF DESCRIPTION OF THE DRAWINGS

Notwithstanding any other forms which may fall within the scope of the present invention, preferred forms of the invention will now be described, by way of example only, with reference to the accompanying drawings in which.

DETAILED DESCRIPTION OF THE EMBODIMENTS

A preferred embodiment of a sewage waste water treatment system will now described with reference to FIGS. 1 and 2. This embodiment is not claimed. A waste water treatment system is operated to reduce impurities in sewerage waste water to an acceptable level for dumping. The system includes a horizontal subsurface filter (HSF) bed having an inlet zone through which the inflow of waste water is permitted to pass, a treatment zone which permits the waste water to undergo treatment by removal of at least some of the impurities of the polluted water and an outlet zone from which the treated waste water flows from the HSF bed and a collection well from which the treated waste water can be redirected.

The impurities may include, for example, organic materials (BOD and COD) and nutrients such as nitrogen and phosphorus. The collection well has a pump located therein to recycle the treated effluent back to either the inlet zone or the treatment zone of the HSF or to a secondary vertical filter.

A level switch located in the inlet zone of the HSF controls the level of water in the inlet zone to a set level by regulating the amount of recycle water returned directly to the HSF or indirectly via the vertical filter. The vertical filter may be used to pre-treat any recycled polluted water before it re-enters the HSF and furthermore, it may also be used to remove phosphates from the waste water by adsorption and precipitation in an aerobic condition with suitable media.

In this way, the preferred embodiment provides an improved method for maintaining the performance of the HSF by keeping the HSF at relatively steady-state composition which can be regulated according to desired performance.

Figure 1:
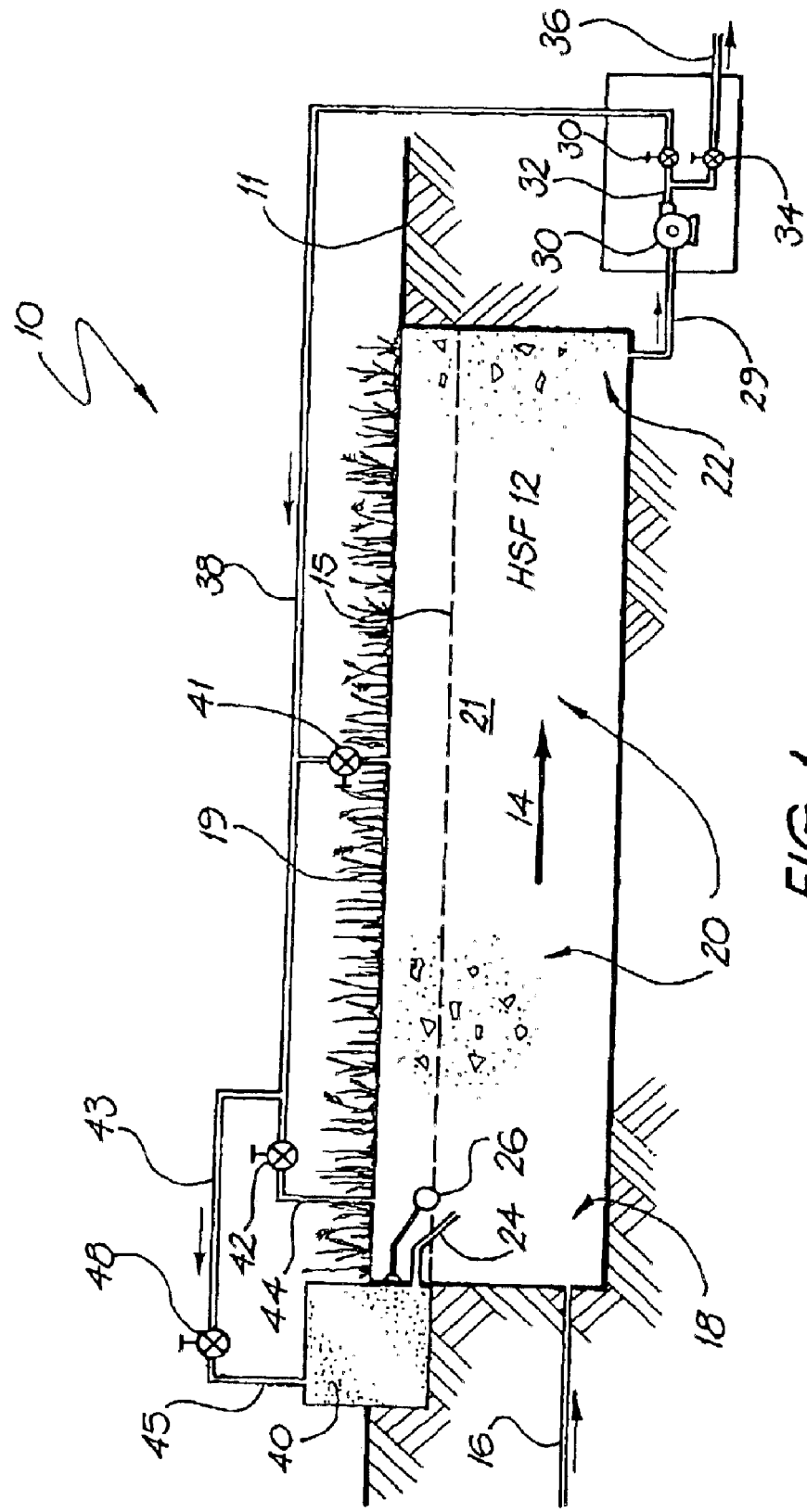
FIG. 1 is a schematic illustration of one embodiment of a polluted water treatment system.

Referring now to FIG. 1, there is shown a schematic illustration of the preferred embodiment of a waste water treatment system 10. The waste water treatment system 10 includes a primary filter bed in the form of a horizontal sub-surface filter (HSF) 12 which has been formed within the ground so that the top surface of the HSF 12 is at ground level 11.

Waste water enters the HSF 12 via the system input line 16 which feeds into an inlet zone of the HSF 12 shown generally by arrow 18. The system input line 16 is connected to an upstream anaerobic digester which allows the breakdown of sewage waste for a period of about 24 hours before it is transferred for treatment by the polluted water treatment system 10. The upstream anaerobic digester is typically a septic tank.

In this embodiment, raw sewerage is stored for 24 hours in a holding tank (not shown) before being pumped to the HSF 12 via the system input line 16.

As the polluted water flows from the inlet zone 18 through the HSF 12 in the direction of arrow 14, it undergoes treatment to remove the impurities as it passes through the treatment zone shown 20 before passing out through the outlet zone 22. The HSF 12 is filled in with appropriate media. The media may be soil, sand, gravel, granulated blast furnace slag, steel furnace slag fines or the like, or a media of two or more of those components, or even two or more layers of those components.

Reeds 19 are grown in the media of the HSF 12 for facilitating oxygen transfer to the bed and venting of gasified pollutants. The reeds are also believed to assist in the removal of some of the pollutants.

The inlet zone 18 includes a small inlet well 24 having a level switch 26 for controlling the level of waste water in the HSF 12, as will be further explained below. Treated waste water is allowed to pass from an outlet zone 22 to a collection well 28 housing a pump 30 having an inlet line 29 in fluid communication with the outlet zone 22. and a control valve 30 on an outlet pipe line 32 of the pump 30. A gate valve 34 is also positioned in line 32. The gate valve 34 feeds treated effluent out to a dumping site via pipe 36.

The control valve 30 allows treated water to travel via recycle line 38 to be recycled back to either the inlet zone 18 or to an aerobic Vertical Filter 40 which is filled in with coarse sand, gravel, granulated blast furnace slag, steel furnace slag fines and the like, or mixtures of two or more of those components. The recycle line has a control valve 42 for controlling the flow of pipe 44 as required when the treated effluent is to be recycled back to the inlet zone 18. Another control valve 48 is located in recycle line 43 for diverting the recycled water to the Vertical Filter 40.

The Vertical Filter 40 is, in this embodiment, adjacent to the inlet zone 18 of the HSF 12. A pipe 24 at the base of the Vertical Filter 40 allows polluted water which has been processed by the Vertical Filter 40 to be transferred to the inlet zone 18 by gravity. In other embodiments, the pipe 24 may not be placed into the inlet zone 18 but may connect to pipe 36 or other outlet line for disposal after treatment.

The waste water, upon entering the system input line 16, is resident in the inlet zone 18. As the water travels through the treatment zone 20 in the direction of arrow 14, organic materials are removed from the HSF 12 by bacterial reactions in the soil. Furthermore, the reeds 19 which grow in the media 21 of the HSF 12 assist in removal of some water from the HSF 12 due to evapotranspiration.

As the water moves within the treatment-zone 20 in the direction of arrow 14, the conditions within the HSF gradually increase from being generally anaerobic conditions in the inlet zone 18 region to being generally aerobic in the outlet zone 22 region.

The bed dimensions and relativity of aerobic and anaerobic zones are critically dependent on the hydraulic design and conductivity of the media. Those skilled in the art of constructed wetlands will readily appreciate and understand the design and operational parameters required to obtain the desired operation of the various zones in the HSF.

The aerobic conditions within certain areas of the HSF 12 cause some of certain impurities such as ammonia and ammonium ions to oxidize to nitrates and nitrites. Typically the outlet water zone 22 contains nitrogen in the relative amounts of about 50% ammonia or ammonium and about 50% nitrates or nitrites on a first pass through the HSF 12. The type of media and hydraulic design has a large influence on this ratio.

The desired water level in the HSF is shown generally by the dashed line 15. The level 15 of waste water in the inlet zone 18 is controlled by the level switch 26 to activate the outlet pump 30. If the water level 15 rises above the set point shown in FIG. 1, the switch 26 switches the pump 30 off and allows the water level 15 to drop below the set point. Should the water level 15 drop below the desired set point then the level switch 26 is activated and this in turn activates the pump again so that recycle fluid is returned to the inlet zone 18 either directly by recycle line 44 or by the Vertical Filter 40 via the recycle line 45. Alternatively, the recycle waste water may be sent directly to the treatment zone 20 via the control valve 41.

The width to length ratio of the bed is designed to pass the maximum flow and full advantage is taken of less than full load to undertake extra treatment and improve the quality performance of the system.

Operating in this way, the polluted water level 15 can be maintained at a relatively constant level and permits a steady state composition within the HSF 12 to exist despite various fluctuations in the system input line 16. For example, if the polluted water treatment system 10 were to service a large twenty room hotel which, over the course of a week places a greater demand on the sewerage system on weekends relative to the mid-week, this fluctuation in demand can be accommodated by maintaining the water levels in inlet zone 18 relatively constant through varying the flow through the recycle line.

Another advantage is provided by the control valves 42, 48 in the recycle lines. The control valves 42, 48 can be regulated by an operating system (not shown) so that the operation of the system can be controlled during variations in the duty required of the system. This provides the operator of the system 10 greater control.

The vertical filter 40 is preferably filled with material of a high hydraulic conductivity, (such as gravel), thereby resulting in the Vertical Filter 40 having a small retention time and also in it being aerobic so as to nitrify any ammonia or ammonium ions which have not been oxidized by the HSF 12. On returning to the HSF to a suitable anaerobic zone the nitrates are denitrified to nitrogen gas and vented from the system 10, thus reducing substantially the total nitrogen in the output from the system. Additionally, the Vertical Filter 40 may also include phosphorus retaining materials such as alumina or lime or iron oxides to remove any phosphorus from the waste water.

This above embodiment provides an integrated system that not only reduces the organic solids from the treatment zone in the HSF but also nitrifies and then denitrifies the polluted water thus removing nitrogen and in addition permits the removal of phosphates. Because the vertical filter 40 is relatively small compared with the HSF 12, the phosphorus retaining materials in Vertical Filter 40 can be periodically removed once the phosphorous retaining materials are fully loaded.

Now referring to FIG. 2, another embodiment will now be described which has an alternate control system to that shown in FIG. 1. In the embodiment of FIG. 2, where particular features of this embodiment function similarly to features described in the embodiment of FIG. 1, these features are marked as the same numeral but with a prime (') for convenience.

Figure 2:
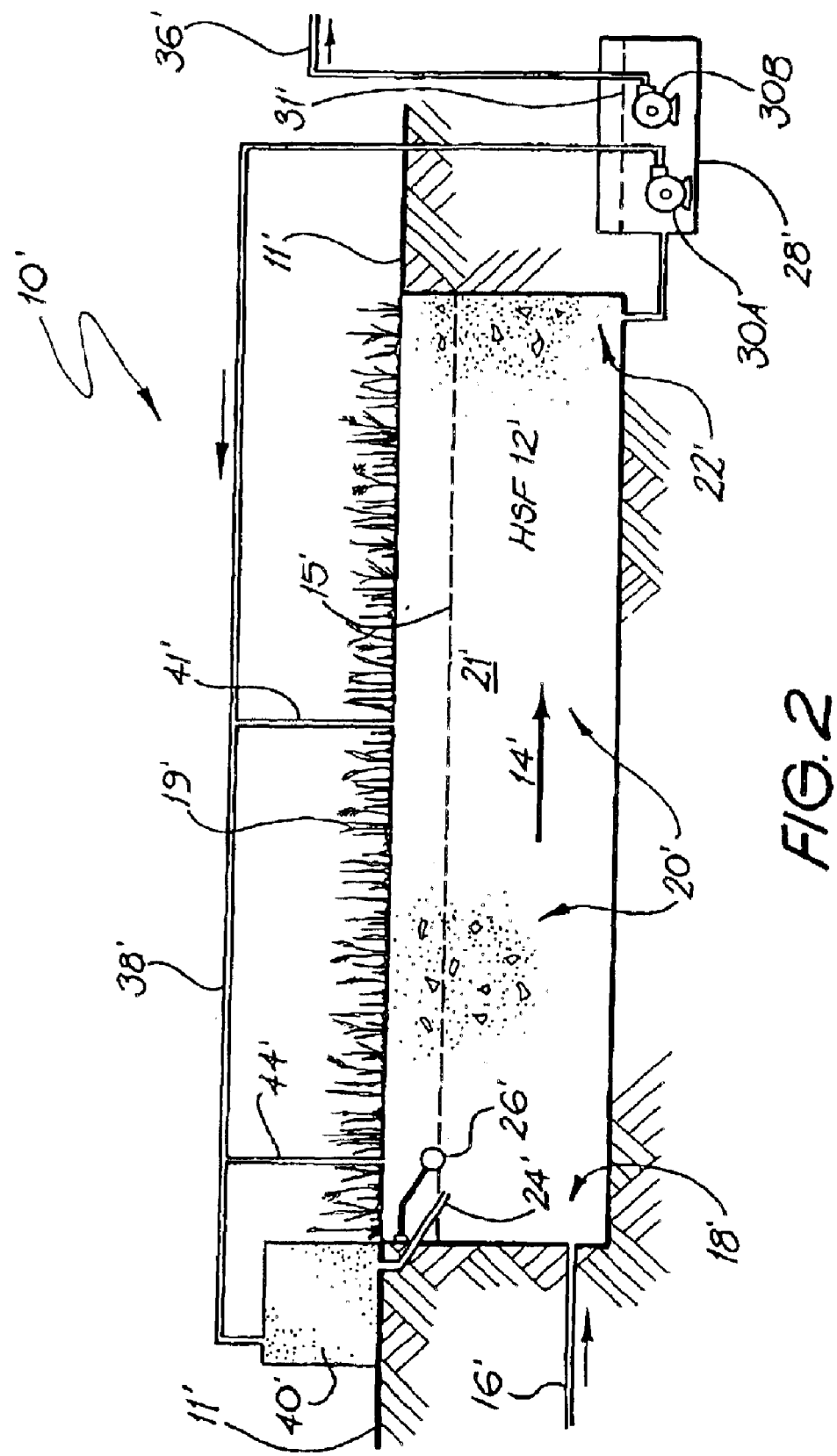
FIG. 2 is a schematic illustration of a second embodiment of a polluted water treatment system.

In the system 10' of FIG. 2, from the outlet zone 22' the treated water travels to the collection well 28'. This is lower than the bottom of the HSF 12' and the treated waste water level 31' in the well 28' is not allowed to rise above the set outlet water level in the HSF 12 otherwise it will affect the HSF operation. This is achieved in the following manner. In the well 28' are two submersible pumps 30A, 30B each with its own built in level control and independently piped to outlet from the well 28'. Pump 30A is set so that if the water level 31' in the well 28' rises to within 30 mm of the bottom of the HSF 12, it pumps water to output 36' from the system 10'. Typically 30A lowers the level 31' in the well 28' by 100-150 mm before switching off. Pump 30B is set so that it activates at say 100 mm below the bottom of the HSF 12' and pumps treated waste water to the inlet zone 18' or to the treatment zone 20' or to the Vertical Filter 40' inlet.

Pump 30B is additionally controlled by the level detector 26' positioned in the inlet zone 18'. In another embodiment, the level detector may be connected to a pipe in fluid communication with the inlet zone 18'.

The level detector 26' will not let the pump 30B operate so long as the inlet zone 18' level is above the desired level 15'. Under peak conditions the level in the well will rise until the pump 30A cuts in and then sends treated water to output 36'. Thus the pump 30B has priority to pump so long as the set inlet level 15' is not exceeded. Hence, recycling in this embodiment is always set to maximum capacity of the HSF 12'. What is not recycled goes to output 36' from the system 10'. Recycled waste water from the collection well 28' will passes to the secondary vertical filter 40' via the recycle line 38'.

As the Vertical Filter 40' is above the HSF12' inlet level 15, gravity transfers waste water to the inlet zone 18' and thus ensures that the VF can always drain and remain aerobic. The Vertical Filter 40' is filled in this case with coarse sand doped with suitable phosphorus retaining materials. It should be realised that in other embodiments, the Vertical Filter 40' could be remote from the HSF 12'.

Recycled water trickles through the Vertical Filter 40' and through an outlet pipe 24' at the inlet zone 18'. In other embodiments, it may be directed to another desired treatment zone 20' of the HSF 12' or if so desired, to direct output without recycling.

In this embodiment, assuming that the first pass output from the HSF 12' contains a fraction of nitrogen as 50% ammonia and 50% nitrates and some amount of phosphorus. Recycling to the Vertical Filter 40' will:

1) oxidise nearly all the ammonia to nitrates; and
2) remove nearly all of the phosphorus.

On returning to the HSF 12' into a suitable anaerobic zone the nitrates are reduced to gaseous nitrogen and vented. A further gain is that the oxygen from the nitrates contributes to the accelerated degradation of organic material in the early (anaerobic) section of the HSF 12'. Thus this results in increasing the operating efficiency of the system 10' in all respects.

Not all of the nitrogen or phosphorus will be removed because the recycle rate is not 100% but a fraction of this and a proportion of the waste water only goes through once.

Different operating sequences of the system can achieve different desired end results. By utilising the different characteristics of the VF and HSF and varying the recycling and flow paths it is possible to choose between different proportions of ammonia, nitrates, phosphorus and organics in the ultimate output.

It should also be realised that the treatment zone media is chosen by the designer and his/her choice has a major effect on the design dimensions and hydraulic profile through the bed. This in turn has an effect on the relative areas of aerobic and anaerobic activity and hence the relative proportions of ammonia and nitrates in the effluent and the ability of the bed to fix phosphorus. In the current embodiment, the media is soil based and in which case the relative proportion of ammonia and nitrates in the treated water will be about equal on a first pass basis.

Another advantage of the embodiment of FIG. 2 is that because two pumps are used, it is not necessary to purchase expensive control valves which also require a high degree of sophisticated control.

Figure 3:
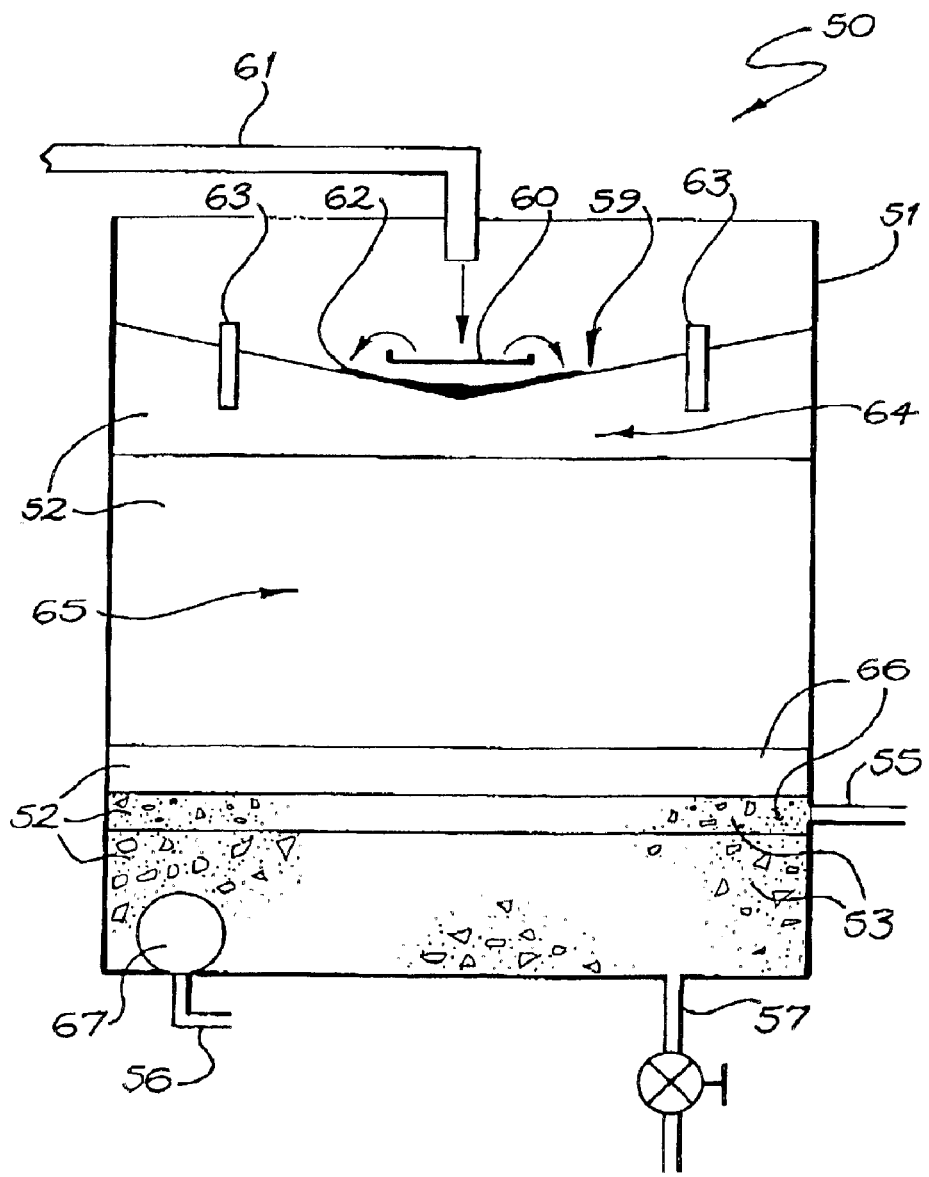
FIG. 3 is a schematic side view in cross section of a filter in accordance with the third and fourth aspects of the present invention.

A preferred embodiment of a filter in accordance with the third aspect of the present invention is shown in FIG. 3. This filter may be used in place of secondary filter beds 40, 40' of the embodiments of FIG. 1 and FIG. 2 or it may be used as the secondary filter bed of the embodiment of FIG. 4.

The filter unit 50 shown in FIG. 3 comprises a vessel 51 for holding a bed of filter material 52. The bed of filter material 52 comprises a layered bed having a lower layer 53 of gravel or other course granular or particular material and an upper layer 54 of granulated blast furnace slag. The upper layer 54 may further include added iron oxides to assist in removal of phosphorus.

The filter also includes a first water outlet 55, which drains to waste and a second water outlet 56. Second water outlet 56 is used for returning recycled water to the HSF 12, 12' of FIGS. 1 and 2. A drain outlet 57 having a closure valve 58 is also provided in order to enable the vessel 51 to be rapidly drained of water for shutdown and/or maintenance.

The upper part of the bed of filter material 52 is shaped into a generally shallow conical shape 59. A shallow tray 60 is positioned approximately in the centre of the generally shallow conical shape 59 of the top of the bed of filter material 52. Waste water to be treated by the filter 50 is supplied via inlet line 61.

Operation of the filter 50 will now be described.

Inflow water, for example, taken from the outlet of HSF 12 or 12', as shown in FIGS. 1 and 2, is piped via inlet line 61 to shallow tray 60. The inlet water cascades over the lip of shallow tray 60 onto the surface of the bed of filter material 52. The water then passes downwardly through the bed of filter material 52. On start up, the water flows straight through in a small zone in the central part of the filter bed 52 but over time a layer, shown schematically at 62, of organic material slime and fine solids accumulates on the surface. This layer is known as a clogging mat or smutzdecke layer. Eventually, the layer 62 spreads over the surface of the filter and would eventually inhibit the flow of oxygen to the bed of filter material 52. However, shaping the upper surface of the bed of filter material 52 into the generally shallow conical shape 59 as shown in FIG. 3 helps to prevent the layer 62 spreading over the entire upper surface of the filter bed 52. With the shape of the upper surface of the bed of filter material 52 being shaped into the generally shallow conical shape 59, the water area covering the surface does increase as the layer 62 develops. But as it does so, the water depth over the layer 62 also increases, which increases the hydraulic driving head that forces the water through the layer 62. Thus, a stable position is reached. In practice, the area covered by the water changes in consequence with the flow rate into the filter but the variation has been found to be not enough to make large changes. The clogging mat or layer 62 is a desirable feature as it serves to distribute the water input to the filter bed 52 over a wider area and ensure the effective use of the filter area. Furthermore, the layer 62 is a very effective filter for removal of fine colloidal solids and pathogens. Oxygen can be made to bypass the layer 62 by the insertion of short lengths of pipe 63. The short lengths of pipe may desirably be inserted to depths of about 30 mm.

In operation of the filter 50, an upper aerobic zone 64 is established. In this zone, oxygen is rapidly utilised to nitrify a number of the nitrogen containing compounds in the water. Thus, the upper aerobic zone 64 may be considered to be a nitrification layer. The depth of zone 64 is regulated by the conditions necessary for the survival of the bacteria that undertake the nitrifying reactions. The depth of the zone 64 is probably limited by the increasing difficulty for air to diffuse into the lower reaches of the zone.

Located underneath (and therefore downstream of) the upper aerobic zone is an anaerobic zone 65. The denitrification takes place in this zone. The rapidly decreasing availability of oxygen in this zone initiates the denitrification reactions and nitrogen and carbon dioxide (the products of the reactions) diffuse upwardly. The partial pressures of these gasses increases and this inhibits the movement of oxygen downwardly.

In operation of the bed, the water flows downwardly and collects in a lower part of the filter bed. If recycled to the HSF is not required, water accumulates in the lower part of the bed, particularly in the lower layer 53 of gravel. When the water level in the bed reaches the height of first water outlet 55, it flows out through first water outlet 55. It will be appreciated that the water flowing out of first water outlet 55 is extremely unlikely to completely fill the outlet 55. As a result, air can flow into the filter bed through the outlet 55. Thus, a lower aerobic layer 66 is established. In this layer, oxygen is available. If any ammonia does not get completely nitrified in zone 64 and subsequently denitrified in anaerobic zone 65, that ammonia will be nitrified in lower aerobic layer 66. Ammonia may remain in the water passing through an aerobic zone 65 because some ammonia and organic nitrogen may be getting through upper aerobic zone 64 or some organic nitrogen may be produced in anaerobic zone 65 due to the breakdown of bacteria in that zone. This organic nitrogen will be converted into ammonia in the denitrification zone 65.

This remaining ammonia will largely be nitrified in the lower nitrifying layer 66 and this product sets the lower limit of the total remaining nitrogen in the system. In other words, there is a background level of decaying organics produced in the filter 50 which sets the lower limits of nitrogen in the output. Any further reduction in nitrogen would require another denitrification layer. It has been found that a small amount of denitrification takes place in the lower part of gravel layer 53. This suggests that it may be possible to utilise this area in a more effective way to increase nitrogen removal, for example, by increasing retention time or by pulse loading that layer.

A submersible pump 67 is used to return water via second water outlet 56 to the HSF 12 or 12 prime. The action of the pump 67 is controlled by a level detection device at the entry end of the HSF. The total volume of water passing through the HSF is controlled by the difference in levels of the level controller and the set exit level of the HSF. Any remaining nitrites or nitrates in the returned water is denitrified in the HSF. Of course, input must equal output so a quantity equal to the input goes to waste through the outlet 55. The ratio of the throughput through the HSF to the output is called the recirculation ratio. This ratio is the means for controlling the loading of the filter at relatively constant conditions and of setting a bottom limit on the nitrogen in the output.

Figure 4:
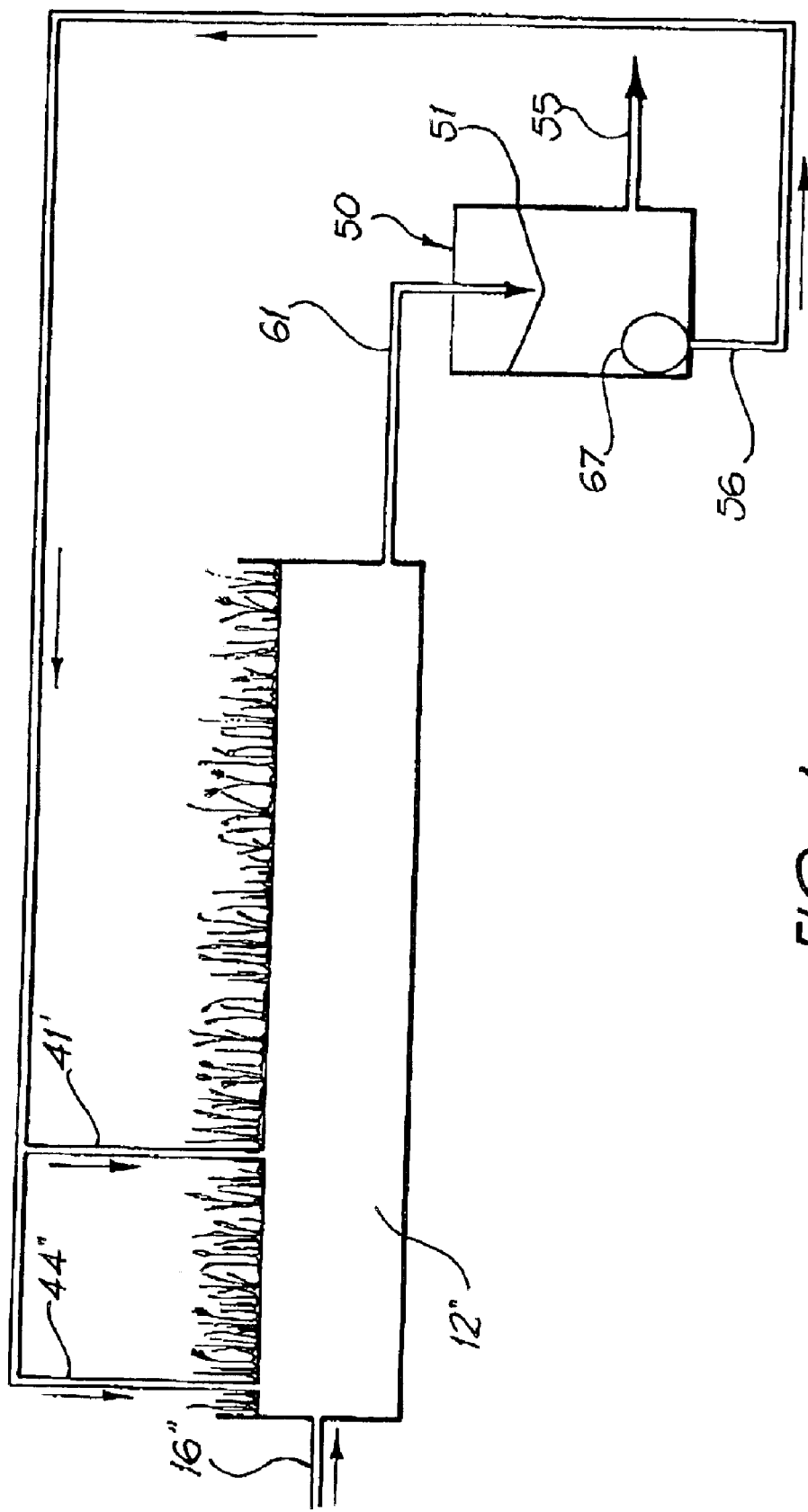
FIG. 4 is a schematic diagram of a further embodiment of the present invention.

Turning now to FIG. 4, which shows an embodiment of the first and second aspects of the present invention which utilises a filter constructed and operated in accordance with the third and fourth aspects of the present invention as a secondary filter bed, the apparatus of FIG. 4 is generally similar to that as shown in FIG. 1 and like features are denoted by the same reference numeral but with a double prime (") added thereto. These like features need not be described further.

The water that has been treated in HSF 12" is removed via outlet 29" and is fed into filter 50. Filter 50 is identical to that shown in FIG. 3. After treatment in filter 50, water collects in the lower part of filter vessel 51. When the level controller 26" of HSF 12 indicates that further water is required, pump 67 is activated to send treated water from filter 50 through outlet 56 into recycle line 38" and thereafter into the inlet zone or the treatment zone of HSF 12" via lines 44" or 41" respectively.

The particular arrangement of the filter used in FIGS. 3 and 4, particularly with outlet 55, ensures that water cannot accumulate in filter 50 above the level of outlet 55. If the water accumulates to the level of outlet 55, it will flow out of outlet 55 under the influence of gravity and hydrostatic pressure. Thus, filter 50 can self-regulate the volume of water accumulated therein. Accordingly, it is only necessary to supply a single submersible pump 67 in filter 50.

The preferred filter medium for use in filter 50 is granulated blast furnace slag (GBFS). GBFS is a glassy granular material that is a non-metallic product consisting essentially of silicates and alumina silicates and alumino silicates of calcium and other bases. The product is typically produced by passing molten slag from a blast furnace through high volume water sprays, which breaks the slag stream up into small droplets and cools those droplets very quickly to suppress crystallisation. GBFS is a sand-like material with a porous, amorphous structure ranging from white to golden brown in colour. A typical GBFS comprises 38 to 43% calcium oxide, 32-37% silicon dioxide, 13-16% aluminium oxide, 5-8% magnesium oxide and minor amounts of iron oxide, titanium dioxide, manganese oxide, potassium oxide, sulphur and sodium oxide. As mentioned earlier, GBFS is typically composed of silicates and alumina silicates and the above breakdown into separate metal oxides represents the oxide equivalents in the material.

Without wishing to be bound by theory, the present invention believes that GBFS is especially suitable for use in the present invention because it has the ability to treat the following of pollutants:

(1) Ammonia—it is believed that ammonia is absorbed by the GBFS and thereafter reacts with alumina silicates.
(2) Phosphorus—it is believed that phosphorus is initially absorbed onto the particle surfaces, but as the GBSF hydrates, calcium oxide is momentarily released and this then is available to react with phosphorus to form insoluble calcium phosphates.
(3) Heavy metals—it is believed that these are absorbed into the matrix of the GBFS.

It will be appreciated that other filter materials may also be used in the present invention. For example, steel furnace slag fines may be used. This material has a higher iron and iron-oxide content that GBFS and accordingly it has enhanced capacity to remove phosphorus. Indeed, it may be preferred to have a layer of steel furnace slag fines at the bottom of the filter 50 in order to reduce the phosphorus content in the water.

The above advantages of GBFS and steel furnace slag fines are also believed to accrue if they are used as part or all of the media in the reed bed or HSF 12.

Figure 5:
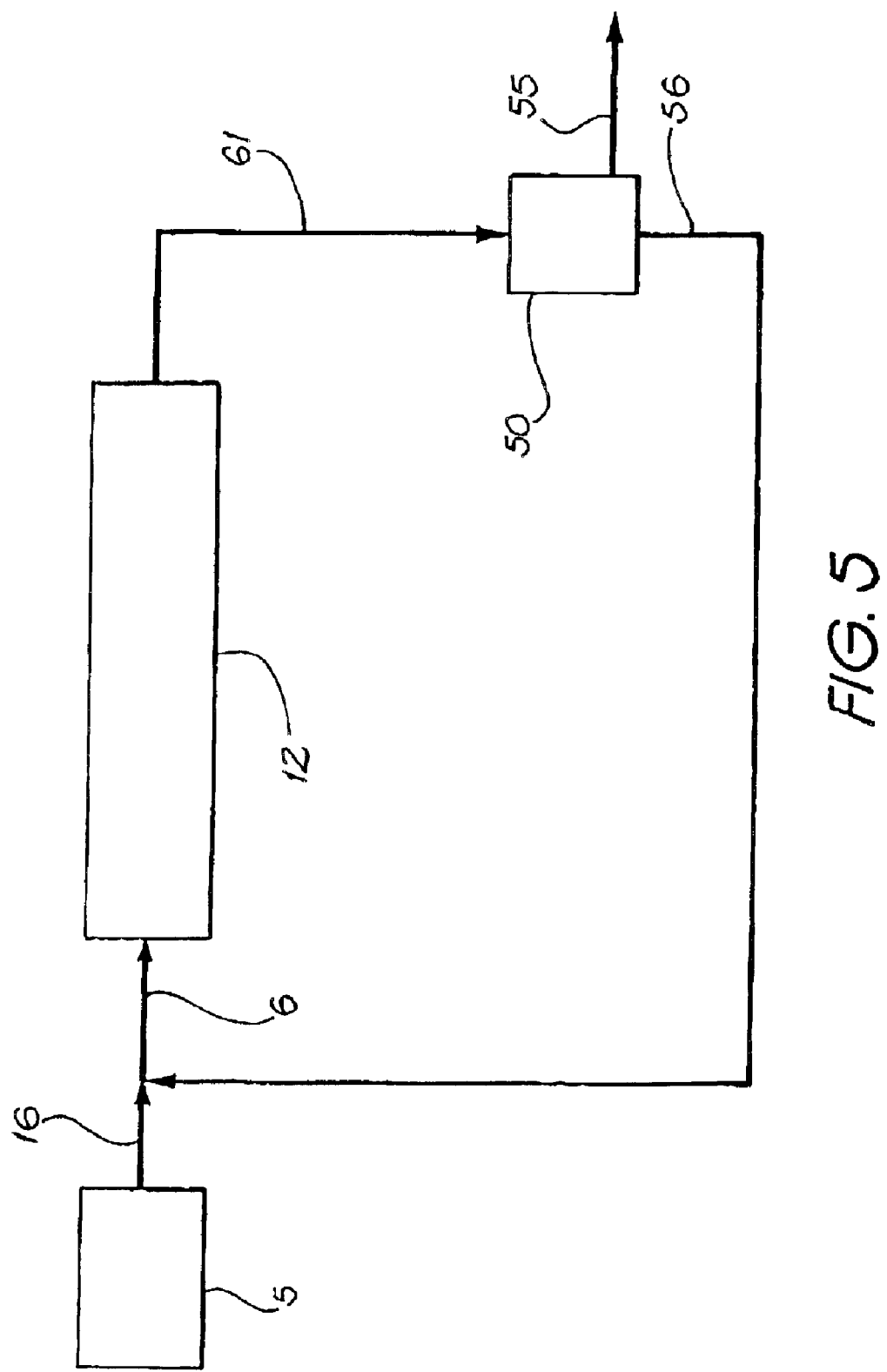
FIG. 5 is a schematic diagram showing the layout of the test facility used to obtain the results shown graphically in FIG. 6.
Figure 6:
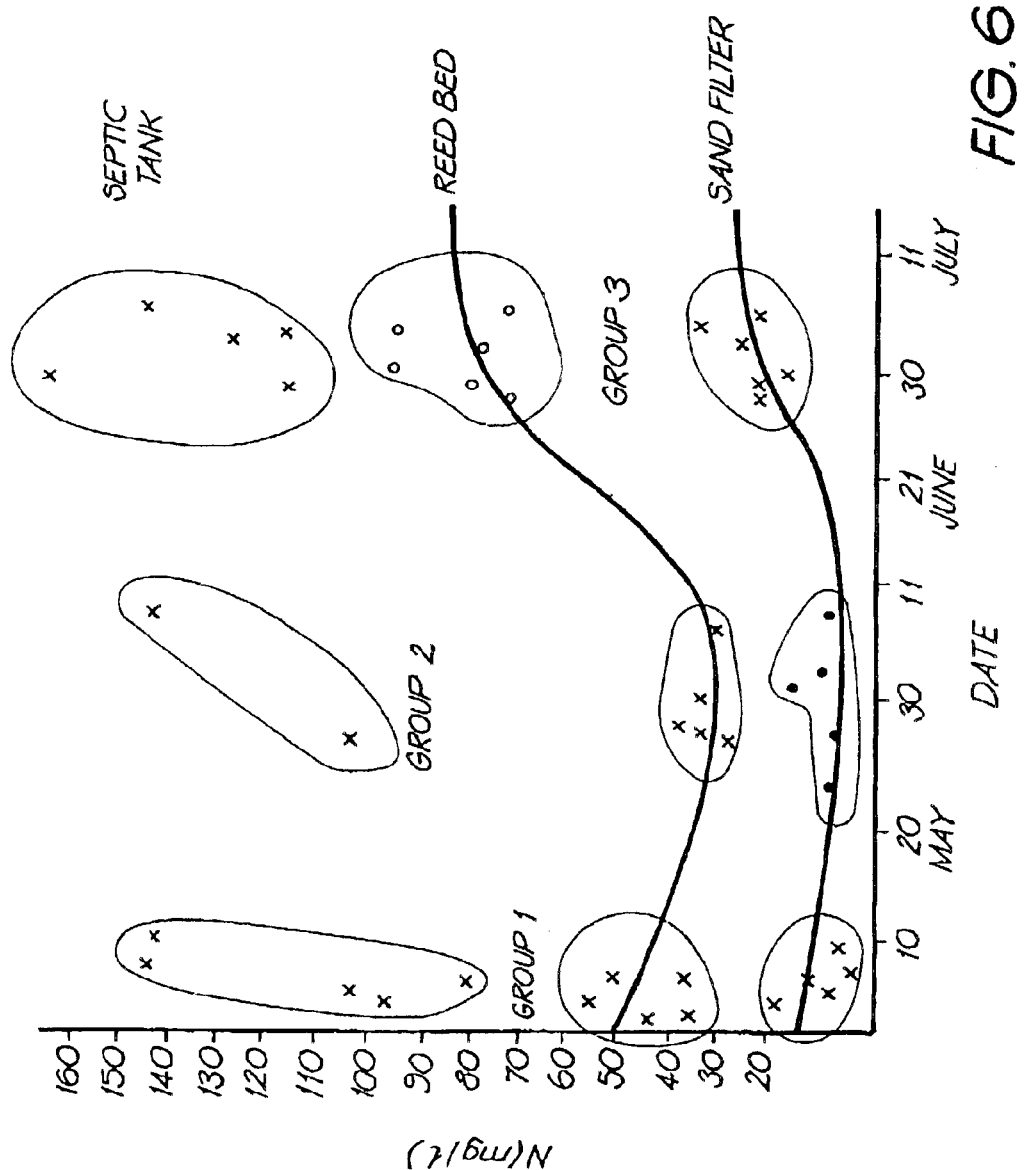
FIG. 6 is a graph showing the results of water treated in accordance with an embodiment of the invention.

In order to demonstrate the ability of the method and apparatus of the present invention to treat polluted water, a system essentially as shown in FIG. 5 has been constructed and operated. The media used in the HSF contained 60% by weight GBFS. The influent waste water to the HSF constitutes domestic wastes taken from a septic tank 5 (FIG. 5). The total flow rate through this system was in the order of 1,200 litres per day comprising an inflow from septic tank 5 of 450 l/day and a recirculation flow in line 56 of 750 l/day to give a total flow into the reed bed 12 of 1200 l/day through line 6An output from the sand filter 50 through line 55 was set at 400 l/day. A number of parameters were monitored and the results of this monitoring are shown in FIG. 6. The results were taken in three batches. The first was taken in early May about one month after recirculation was switched on. The second batch of results was taken at the end of May, still with recirculation and the third was taken with recirculation off. The inflow was about 450 l/day and the recirculation rate and the recirculation rate, when used, was 2.67, resulting in a total flow through the system of about 1200 l/day when recirculation was used.

From the Graphs of FIG. 6, the trends can be seen, the averages to the different groups are shown in the graph. The circled groups indicate, from top to bottom, the ammoniacal nitrogen from the septic tank 5, the total nitrogen from the reed bed 12 and the total nitrogen from the sand filter. The Fig. shown on the lines have been used to calculate the mass removal rates. The input was set at 140 mg/l TKN. The assumption is that all the organic N is mineralised in the reed bed.

| | | | | |
|---|---|---|---|---|
| Group 2 | Septic Tank mass o/p | 140 mg/1 × 450 l | 63000 mg | |
| | Reed Bed mass o/p | 32 mg/l × 1200 l | 38400 mg | |
| Removal | | | | 24600 mg |
| | Sand filter mass o/o | 8.3 mg/l × 1200 l | 9960 mg | |
| Removal | | | | 28440 mg |
| Total | | | | 53040 mg |
| Lost by recirculation | | 8.3 mg/l × 750 l | 6225 mg | 6225 mg |
| Grand total removal (with recirculation) | | | | 59265 mg |
| Group 3 | Septic Tank mass o/p | 140 mg/1 × 450 l | 63000 mg | |
| | Reed bed mass o/p | 85 mg/l × 450 l | 38250 mg | |
| Removal | | | | 24750 mg |
| | Sand Filter mass o/p | 25 mg/l × 450 l | 11250 mg | |
| Removal | | | | 27000 mg |
| Total removal | | | | 51750 mg |

The Reed bed is removing almost the same amount of nitrogen both ways.

The Sand Filter is removing a little less with the recirculation off.

The ratio final nitrogen from group 3/group 2 is 25/8.3= 3.01, showing that the final nitrogen content in the treated water with recirculation is only one-third of the water treated without recirculation.

The recirculation ration is 1200/450=2.67

As can be seen from FIG. 6, the performance of the reed bed improved with time for the first two groups. For the third group with recirculation switched off, the total nitrogen in the output increased.

It would be appreciated by a person skilled in the art that numerous variations and/or modifications may be made to the present invention as shown in the specific embodiments without departing from the spirit or scope of the invention as broadly described. For example, although the present embodiment has related to a sewerage polluted water treatment system, the system could be applied to the treatment of other pollutants such as oil, paint residues, and hydrocarbon pollutants etc. The present embodiment is therefore, to be considered in all respects to be illustrative and not restrictive.

I claim:

1. A constructed wetland polluted water treatment system for substantially reducing impurities in polluted water, the system comprising:

a primary filter bed having an inlet zone through which inflow of polluted water travels therethrough, a generally anaerobic treatment zone through which said polluted water undergoes treatment by removing at least a portion of said impurities and an outlet zone from which treated polluted water is removed from said filter bed;

level control means for controlling the level of inflow waste water in said inlet zone;

a generally aerobic secondary filter for receiving water from the primary filter, the secondary filter receiving substantially all of the water from the outlet zone of the primary filter; and recycle means for returning at least a portion of said treated polluted water from said secondary filter to said inlet zone or said treatment zone of said primary filter.

2. A constructed wetland polluted water treatment system as claimed in claim 1, wherein the primary filter is a horizontal subsurface filter (HSF).

3. A constructed wetland polluted water treatment system as claimed in claim 1 wherein the primary filter includes a filter medium selected from soil, sand, gravel, vermiculite or various man made substances, including granulated blast furnace slag and steel furnace slag fines and mixtures of two or more thereof.

4. A constructed wetland polluted water treatment system as claimed in claim 1, wherein the secondary filter is a vertical filter (VF).

5. A constructed wetland polluted water treatment system as claimed in claim 1, wherein the media within the secondary filter is coarse and the conditions within the secondary filter are generally aerobic to thereby nitrify at least a portion of said polluted water.

6. A constructed wetland polluted water treatment system as claimed in claim 1, wherein a plurality of emergent macrophyte plants are planted in the media of the treatment zone.

7. A constructed wetland polluted water treatment method for substantially reducing impurities of polluted water, the method comprising the steps of:

(a) permitting polluted water to flow into an inlet zone of a primary filter bed (b) removing at least a portion of said impurities in a treatment zone;

(c) removing treated polluted water from an outlet zone adjacent to an end of said treatment zone;

(d) treating water from the outlet zone of the primary filter bed in a secondary filter and recycling a portion of the water leaving the secondary filter to the primary filter bed and disposing of the remainder of the water from the secondary filter bed; and (e) controlling the level of inflow polluted water in said inlet zone by regulating the quantity of treated polluted water recycled in step (d).

8. A sub-surface flow type constructed wetland for treating polluted water comprising within said constructed wetland, a filter bed formed of particulate material, wherein said particulate material is comprised of granulated blast furnace slag and/or steel furnace slag fines.

9. A constructed wetland as claimed in claim 8 wherein the steel furnace slag fines and/or blast furnace slag fines are mixed with other granular material, said other granular material including any one or more of the following: sand, soil or gravel vermiculite.

* * * * *